United States Patent
Rana

(10) Patent No.: US 11,519,044 B2
(45) Date of Patent: Dec. 6, 2022

(54) METHOD OF SHAPING AN ARTICLE FROM A ZINC OR ZINC ALLOY COATED STEEL BLANK

(71) Applicant: TATA STEEL IJMUIDEN B.V., Velsen-Noord (NL)

(72) Inventor: Radhakanta Rana, Alkmaar (NL)

(73) Assignee: TATA STEEL IJMUIDEN B.V., Velsen-Noord (NL)

(*) Notice: Subject to any disclaimer, the term of this patent is extended or adjusted under 35 U.S.C. 154(b) by 38 days.

(21) Appl. No.: 16/968,255

(22) PCT Filed: Feb. 8, 2019

(86) PCT No.: PCT/EP2019/053190
§ 371 (c)(1),
(2) Date: Aug. 7, 2020

(87) PCT Pub. No.: WO2019/155014
PCT Pub. Date: Aug. 15, 2019

(65) Prior Publication Data
US 2021/0032714 A1 Feb. 4, 2021

(30) Foreign Application Priority Data
Feb. 8, 2018 (EP) .................................. 18155866

(51) Int. Cl.
*C21D 6/00* (2006.01)
*B32B 15/01* (2006.01)
(Continued)

(52) U.S. Cl.
CPC ............ *C21D 6/008* (2013.01); *B32B 15/013* (2013.01); *C21D 1/185* (2013.01); *C21D 1/673* (2013.01);
(Continued)

(58) Field of Classification Search
CPC ...... B32B 15/013; C21D 1/185; C21D 1/673; C21D 2211/001; C21D 2211/005;
(Continued)

(56) References Cited

U.S. PATENT DOCUMENTS

2016/0312323 A1* 10/2016 Rana .................... C22C 38/001
2018/0030567 A1    2/2018 Yi et al.

FOREIGN PATENT DOCUMENTS

CN    106906421 A    6/2017
EP    2703512 A1    3/2014
(Continued)

OTHER PUBLICATIONS

International Search Report and Written Opinion dated May 13, 2019 for PCT/EP2019/053190 to Tata Steel Ijmuiden B.V. filed Feb. 8, 2019.

(Continued)

*Primary Examiner* — Jenny R Wu
(74) *Attorney, Agent, or Firm* — Vorys, Sater, Seymour and Pease LLP

(57) ABSTRACT

A method of shaping an article from a zinc or zinc alloy coated steel blank, including the steps of: a) providing a blank of the zinc or zinc alloy coated steel; b) reheating of the blank obtained in step a) to a reheating temperature $T_{RH}$ in the range Ac3-200° C. of the steel; c) soaking the blank for a time up to 3 minutes at the reheating temperature $T_{RH}$; d) shaping the article in a press; and e) cooling the article. The steel includes (in wt. %) C: 0.01-0.2; Mn: 3.1-9.0; Al: 0.5-3.0; and optionally further alloying elements selected from Si, Cr, V, Nb, Ti and Mo; inevitable impurities and the balance is Fe.

17 Claims, 1 Drawing Sheet

Field of view: 0.5 mm x 0.15 mm

(51) Int. Cl.
*C21D 1/18* (2006.01)
*C21D 1/673* (2006.01)
*C22C 38/00* (2006.01)
*C22C 38/02* (2006.01)
*C22C 38/06* (2006.01)
*C22C 38/22* (2006.01)
*C22C 38/24* (2006.01)
*C22C 38/26* (2006.01)
*C22C 38/28* (2006.01)
*C22C 38/38* (2006.01)

(52) U.S. Cl.
CPC .............. *C21D 6/002* (2013.01); *C21D 6/005* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/38* (2013.01); *C21D 2211/001* (2013.01); *C21D 2211/005* (2013.01); *C21D 2211/008* (2013.01)

(58) Field of Classification Search
CPC .. C21D 2211/008; C21D 6/002; C21D 6/005; C21D 6/008; C21D 8/005; C22C 38/001; C22C 38/002; C22C 38/02; C22C 38/04; C22C 38/06; C22C 38/22; C22C 38/24; C22C 38/26; C22C 38/28; C22C 38/38; C22C 2/06; C22C 2/26
See application file for complete search history.

(56) References Cited

FOREIGN PATENT DOCUMENTS

| EP | 2778247 A1 | 9/2014 |
| EP | 3093359 A1 | 11/2016 |
| WO | 2008102009 A1 | 8/2008 |
| WO | 2016158160 A1 | 10/2016 |
| WO | 2017092104 A1 | 6/2017 |

OTHER PUBLICATIONS

Yun-Bo Xu et al., XP055480363, Effect of two-step intercritical annealing on microstructure and mechanical properties of hot-rolled medium manganese TRIP steel containing δ-ferrite, vol. 688, pp. 40-55, Mar. 1, 2017. Amsterdam, NL.

Sung Joon Kim, XP055480369, Effects of Manganese Content and Heat Treatment Condition on Mechanical Properties and Microstructures of Fine-Grained Low Carbon TRIP-Aided Steels, Materials Science Forum, vol. 638-642, pp. 3313-3318, Jan. 1, 2010.

* cited by examiner

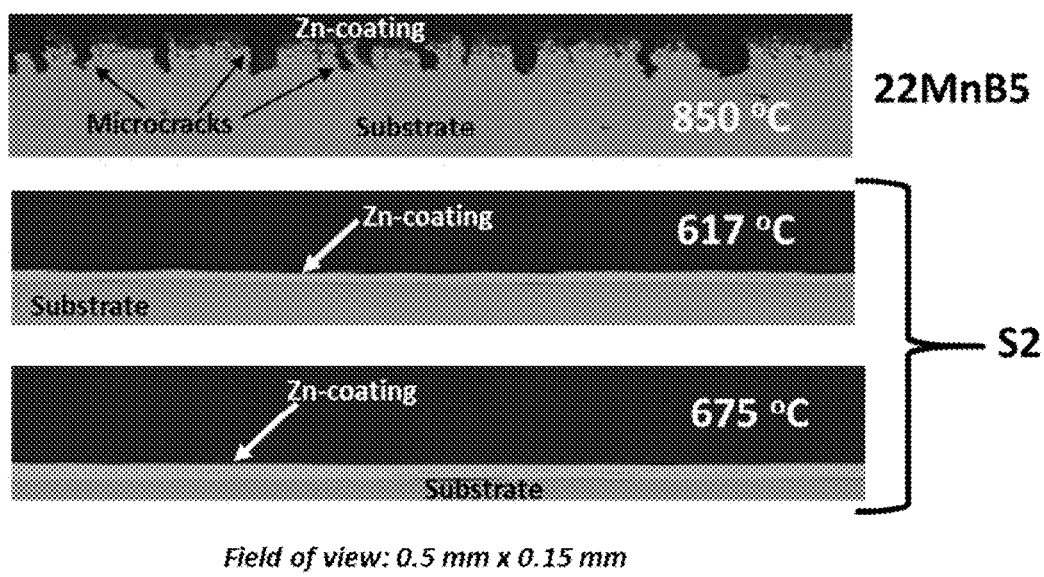
*Field of view: 0.5 mm x 0.15 mm*

METHOD OF SHAPING AN ARTICLE FROM A ZINC OR ZINC ALLOY COATED STEEL BLANK

CROSS-REFERENCE TO RELATED APPLICATIONS

This is a § 371 National Stage Application of International Application No. PCT/EP2019/053190 filed on Feb. 8, 2019, claiming the priority of European Patent Application No. 18155866.9 filed on Feb. 8, 2018.

The present invention relates to a method of shaping an article from a zinc or zinc alloy coated steel blank, as well as to a shaped article.

Hot press forming also known as hot stamping, press stamping and press hardening is a technique to form and harden a steel blank into a shaped final article or part. Generally, a blank is reheated to and soaked at austenitizing temperatures, typically in the range of 870-940° C., and then subsequently formed and press-quenched in the press dies. The high temperatures are required to fully austenitize the steel and dissolve all carbides. Quenching results in a strong martensite structure in the steel substrate. Even when hot forming is performed in the intercritical range in order to develop a dual phase structure, the reheating temperature is 760° C. or more. In the commonly applied heating furnaces the total reheating time is relatively long. A total time of 3-10 minutes in the furnace is common practice.

It is known that hot forming of uncoated steel blanks results in oxidation. Zn and Al-based coatings have been applied to reduce this effect. In view of corrosion resistance Zn based coatings may be preferred as they offer also galvanic protection. However, due to the low melting temperatures of Zn and Zn—Fe compounds, the high reheating temperatures and slow heating rates and associated long total heating and soaking times surface cracking may occur during hot forming, where cracking has been related to grain boundary penetration of liquid zinc. One route to solving this problem that has been explored, is modification of the Zn coating.

Hot formed products of current (ultra)high strength have a very low in-service ductility (<8%) due to their martensitic or martensitic-bainitic microstructure obtained due to press quenching. The martensitic microstructure in the hot formed products is aimed mainly to deliver the required strength level (>1000 MPa). However, such a microstructure for the hot formed products can give a maximum total elongation of only about 6%. Although a single phase martensitic microstructure can give a good bendability (e.g. >100° for 1000 MPa level and about 50° for 1500 MPa level), the crash energy absorption capacity in these products is low due to low total elongation. From US2016/0312323A1 inter alia a method of producing an ultrahigh strength steel alloy is known. This known method comprises a step of providing a ferrous alloy comprising carbon and more than 2.5 wt. % manganese, a step of annealing the ferrous alloy at a first temperature to form an annealed alloy, hot forming the annealed alloy at a second temperature to form an intercritical or austenite structure and cooling the thus annealed austenitic alloy to form the ultrahigh strength steel. In an embodiment the annealed alloy is subjected to hot forming in an intercritical annealing temperature range. In another embodiment the hot forming temperature is at the austenitizing annealing range. The soaking time is between about 1 minute and about 10 minutes. In the Examples the thermal cycles of hot forming were simulated without inducing actual deformation, after a continuous annealing step of cold rolled sheets.

The present invention aims also at profiting of the galvanic protection offered by zinc based coatings for (ultra) high strength steels and reducing the risk of generating (micro)cracks.

Another object of the invention is to improve total elongation of hot formed ultrahigh strength steels.

Accordingly, the method of shaping an article from a zinc or zinc alloy coated steel blank according to the invention, wherein the steel consists of (in wt. %):
C: 0.01-0.2;
Mn: 3.1-9.0;
Al: 0.5-3.0;
optionally one or more further alloying elements:
Si: less than 1.5;
Cr: less than 2.0;
V: less than 0.1;
Nb: less than 0.1;
Ti: less than 0.1;
Mo: less than 0.5;
inevitable impurities; and
the remainder being Fe,
comprises the steps of:
a) providing a blank of the zinc or zinc alloy coated steel;
b) reheating of the blank obtained in step a) to a reheating temperature $T_{RH}$ in the range Ac3-200° C. to Ac3 of the steel;
c) soaking the blank for a time up to 3 minutes at the reheating temperature $T_{RH}$;
d) shaping the article in a press; and
e) cooling the article.

The invention is based on modification of the composition of the steel substrate, that is provided with a zinc or zinc alloy based coating. With higher amount of Mn, the temperature where austenite transformation starts (Ac1) and completes (Ac3) on heating are lowered. The reheating is done below Ac3 to obtain an ultrafine intercritical structure with high Mn enrichment in austenite. Due to Mn enrichment during prior intercritical annealing, austenite is stabilized at room temperature giving an ultrafine microstructure with high amounts of retained austenite (20 vol. % or more). As explained below, during reheating at a similar temperature as the prior annealing temperature the room temperature microstructure of the blank is softened, and further Mn partitioning to austenite may take place only to a small extent due to short time of reheating and soaking because diffusion of Mn, being a large substitutional element, cannot occur much. Upon cooling to room temperature similarly high retained austenite is obtained. A Mn content higher than 9 wt. % will cause continuous casting of the steel to be difficult due to extreme segregation, and a content lower than 3 wt. % will not give enough Mn enrichment in austenite to achieve sufficient amounts of retained austenite at room temperature. The retained austenite transforms to martensite during deformation causing a transformation induced plasticity (TRIP) effect. Due to the TRIP effect, the product achieves high total elongation and high bendability. Thus total elongation of hot formed ultrahigh strength steels is believed to be achieved according to the invention by generating a microstructure that contains a high amount of retained austenite to cause transformation induced plasticity (TRIP) effect.

Therefore, this modification of the steel substrate composition allows to avoid liquid zinc induced microcracking for two reasons. First the reheating temperature $T_{RH}$ is relatively low thereby avoiding extreme oxidation of Zn and second the total time of reheating and soaking is short so that from a kinetic point of view Zn in the coating does not get sufficient time to liquidify. Moreover, it has been found that the steel composition allows to apply a robust shaping process without requiring the essential hot forming steps of high temperature reheating and press quenching. By employing a different substrate concept according to this invention, i.e. medium Mn steel concept, a high in-service ductility (>15%, preferably >20%) is guaranteed. This, in turn, will increase the crash energy absorption capacity of the product while the bendability is not compromised.

According to the present shaping method a blank of a zinc or zinc alloy coated steel having a steel composition as defined is reheated to a heating temperature $T_{RH}$ in the range of Ac3-200° C. to Ac3 and held for a short time of less than 3 minutes at this temperature. Due to the Mn amount, as explained above, Ac1 and Ac3 are suppressed. Thus the reheating temperature $T_{RH}$ in the range of Ac3-200 to Ac3 is relatively low. In this temperature range and at the relative short soaking time the blank is essentially only softened to facilitate the subsequent shaping step, while the properties of the blank as received remain basically the same, because the starting microstructure does not substantially change and because the main alloying element manganese in the steel substrate composition is not allowed to diffuse significantly. For the same reasons the zinc based coating does not melt, and the interface between Zn and Fe is not weakened, thereby avoiding the generation of (micro)cracks under the load during subsequent shaping. The blank thus reheated is transferred to a shaping tool for deformation, typically a press, wherein the blank is deformed to a desired shape. Subsequent to shaping the article is cooled. Press quenching as is essential in traditional hot forming is not necessary as the austenite with high amount of Mn is very stable, and when it transforms to martensite partially, it has very high hardenability making higher rate press quenching unnecessary. The shaped article may be removed from the press and allowed to cool in ambient atmosphere. Forced cooling with air or combined press quenching followed by (forced) cooling in air is also possible.

In an advantageous embodiment the reheating step b) is a flash reheating step, wherein reheating of the blank to the reheating temperature $T_{RH}$ is performed at a high rate leaving barely any time for melting and diffusion processes to occur. Advantageously the reheating rate is 30° C./s or more. In an embodiment the reheating rate is at least 60° C./s, preferably 100° C./s or more. Currently reheating for hot forming is performed in long (e.g. approximately 60 m) furnaces, wherein reheating time is less controlled. Different reheating times from blank to blank may result in differential coating behaviour as a result of varying diffusion of the Zn coating in the substrate steel.

The above high reheating rates may be obtained by induction heating. An induction furnace if used in performing the method according to the invention, can be designed smaller, which provides more control over the heating time from blank to blank. Also a small induction furnace requires less financial investment.

In an embodiment the reheating temperature $T_{RH}$ is in the range of Ac3-100° C. to Ac3, or in the intercritical temperature range Ac1-Ac3. In an embodiment the reheating temperature $T_{RH}$ is below 700° C. In another embodiment it is below 675° C., in order to avoid extreme oxidation of Zn.

In step c) the reheated blank is soaked, preferably as briefly as possible. As explained above, the purpose of reheating and soaking is to soften the steel and not to alter the microstructure of the blank as received. Suitable soaking times are less than 3 minutes, while a soaking time of less than 2 minutes is advantageous. Preferably the reheated blank is soaked for a time of less than 1 minute, preferably less than 30 seconds. Reduction of the total time of reheating and soaking reduces the processing time considerably, allowing a higher production rate.

The reheated blank is transferred from the furnace or other heating equipment to the shaping tool for deforming. Preferably the transfer time is short, preferably within 10-15 seconds. In an advantageous embodiment the temperature drop during transfer does not exceed 150° C. Preferably the temperature drop is in the range of 100-150° C. If the temperature drop is higher, then the blank might be too cold to deform in the subsequent shaping step.

The present process allows the shaped article to be taken out from the press just after deformation, e.g. at an exit temperature in the range of 100-450° C., such as 200-425° C., because press quenching is not necessary.

In step e) cooling rates in the range of about 3 to about 5° C./s represent a practical value, which can be obtained during air cooling of the shaped article (thickness 1-1.5 mm).

In an embodiment cooling step d) is performed in the press by press quenching, advantageously to a temperature in the range of 100-250° C., preferably in the range of 150-200° C. A quenching rate of at least 3° C./s is suitable in view of hardenability. Even if although the reheating time is short, the martensite in the blank transforms to austenite during reheating, this relatively slow cooling rate will ensure that austenite is again transformed to martensite in the shaped article. Advantageously the quenching rate is at least 5° C./s. After removal from the press the shaped article is allowed to cool further down to ambient temperature.

Alternatives for press quenching like air cooling or forced air cooling are also contemplated.

As explained above due to the chemistry of the steel blank composition, the reheating and soaking steps conditions avoid circumstances that are favourable for Zn liquification and consequently avoid conditions that are favourable for microcracking during the subsequent shaping step. Moreover, the microstructure of the zinc or zinc alloy coated steel blank is not changed essentially during these steps.

In a preferred embodiment the zinc or zinc alloy coated steel blank is obtained in step a) from a zinc or zinc alloy coated, intercritically annealed, cold rolled or hot rolled strip.

In an embodiment the zinc or zinc alloy coated steel blank is manufactured by the following process:
1) Steel making e.g. by refining in a converter or an electric furnace and then secondary refining in a vacuum degassing furnace;
2) Preparing a slab for example by casting; direct strip casting or slab casting;
3) Reheating the slab if required;
4) Hot rolling to strip form;
5) Cooling and coiling;
6) Optionally batch annealing;
7) Pickling;
8) Cold rolling;
9) Intercritical annealing (continuous or batch wise); and
10) Zn coating e.g. hot dip galvanizing, electrogalvanizing or galvannealing.

The hot rolled strip obtained from step 4) can also be subjected directly to steps 9) and 10)

The intercritical annealing step 9) is typically performed at an annealing temperature below 700° C. Preferably the reheating temperature $T_{RH}$ in steps b) and c) of the method according to the invention is the same or lower than the intercritical annealing temperature applied in step 9).

The steel that is used in the method according to the invention is a medium Mn steel that comprises as main constituents carbon, manganese and aluminium. Optionally other alloying elements selected from silicon, chromium, vanadium, niobium, titanium and molybdenum may be present. Inevitable impurities like N, P, S, O, Cu, Ni, Sn, Sb etc. (originating from the starting materials for preparing the steel composition) may be present. They are not added on purpose or specifically controlled within predetermined limits. The balance of the steel composition is iron.

Carbon is present in an amount of 0.01-0.2 wt. %, such as 0.05-0.20 wt. %, preferably 0.07-0.20 wt. %. It is added mainly in view of strength, although carbon also contributes to stabilizing austenite. In the present composition the austenite stabilizing effect of manganese is much more pronounced due to its higher proportion. A preferred range for carbon is 0.1-0.2, and a more preferred range is 0.1-0.19 wt. %. Too less C will not give the desired strength level of 980 MPa or preferably 1000 MPa, and if C is higher than 0.2, weldability of the formed parts might become poor.

Manganese is present in an amount of 3.1-9.0 wt. %. Manganese reduces the Ac1 and Ac3 temperatures, stabilizes austenite, increases strength and toughness, and causes the TRIP effect by stabilizing austenite at room temperature microstructure. At levels below 3.1 wt. % the effects aimed for are not achieved, while at amounts above 9.0 wt. % problems in casting and segregation will be caused. Also the deformation mechanism would change from transformation induced plasticity (TRIP) to twinning induced plasticity (TWIP). If the Mn content is too low, then insufficient austenite will be retained at room temperature and the stability of the retained austenite will be too low with the result that no ductility benefit can be obtained. Preferably the Mn content is in the range of 3.5-9.0 wt. %. In an embodiment Mn amounts to 5.0-9.0 wt. %. In other embodiments it is 5.5-8.5 wt. %, such as 6.0-7.5 wt. %. In yet another embodiment Mn is present in the range of 7.0-9.0 wt. %, such as 7.2-8.8 wt. %.

Aluminium is added to expand the temperature range Ac1-Ac3 to increase the robustness of the process in view of industrial application. Al is present in an amount of 0.5-3.0 wt. %, such as 0.6-2.9, preferably in the range of 1.0-2.25.

Silicon, if present, is added in an amount of less than 1.5 for increasing strength by solid solution strengthening. If present, the amount is typically more than 0.01 wt. % and less than 1.4 wt. %. Its preferred range is 0.15-1.0 wt. %.

Al and Si contribute both to suppress cementite precipitation to avoid deterioration of ductility. Furthermore, both Al and Si also increase the peak annealing temperature for obtaining the highest amount of retained austenite at room temperature. Therefore, during intercritical annealing the diffusion of Mn is facilitated to have effective Mn partitioning in austenite.

One or more further microalloying elements, selected from the group V, Nb, Ti, Mo and Cr, are optionally present. These microalloying elements increase the strength through precipitation hardening by their carbides, nitrides or carbonitrides. Cr also increases the peak annealing temperature for achieving highest amount of retained austenite at room temperature and reduces the sensitivity of the content of retained austenite with annealing temperature. These result in effective Mn partitioning in austenite and increased process robustness during annealing. If present, the preferred additions are: V: 0.01-0.1 wt. %; and/or Nb: 0.01-0.1 wt. %; and/or Ti: 0.01-0.1 wt. %; and/or Mo: 0.05-0.5 wt. %; and/or Cr: 0.1-2.0 wt. %.

The composition of the zinc or zinc alloy coating is not limited. Although the coating can be applied in various ways, hot dip galvanising is preferred using a standard GI coating bath. Other Zn coatings may also be applied. An example comprises a zinc alloy coating according to WO 2008/102009, in particular a zinc alloy coating layer consisting of 0.3-4.0 wt. % Mg and 0.05%-6.0 wt. % Al and optionally at most 0.2 wt. % of one or more additional elements along with unavoidable impurities and the remainder being zinc. An additional element typically added in a small amount of less than 0.2 wt. %, could be selected from the group comprising Pb, Sb, Ti, Ca, Mn, Sn, La, Ce, Cr, Ni, Zr and Bi. Pb, Sn, Bi and Sb are usually added to form spangles. Preferably, the total amount of additional elements in the zinc alloy is at most 0.2 wt. %. These small amounts of an additional element do not alter the properties of the coating nor the bath to any significant extent for the usual applications. Preferably, when one or more additional elements are present in the coating, each is present in an amount <0.02 wt. %, preferably each is present in an amount <0.01 wt. %. Additional elements are usually only added to prevent dross forming in the bath with molten zinc alloy for the hot dip galvanising, or to form spangles in the coating layer.

The obtained shaped article preferably has a triplex or duplex microstructure comprising (in vol. %):
 ferrite: 30% or more, preferably 40% or more;
 austenite: 20% or more, preferably 30% or more;
 martensite: 50% or less including 0%, preferably 30% or less including 0%.
Advantageously the resulting shaped article has the following properties:
 yield strength: 800 MPa or more,
 preferably 850 MPa or more,
 most preferably 900 MPa or more;
 tensile strength: 980 MPa or more,
 preferably 1000 MPa or more;
 total elongation: 15% or more,
 preferably 25% or more;
 minimum bending angle
 at 1.0 mm thickness: 90° or more, preferably 100° or more.

By using an intercritical annealing step in manufacturing the steel strip as explained above before reheating the blanks cut from the strip, Mn partitioning from ferrite to austenite occurs making the intercritical austenite even more stable. During cooling after intercritical annealing the intercritical austenite does not transform significantly to martensite because of its high stability due to the low Ms, giving a duplex microstructure of ferrite and retained austenite. For low Mn contents, e.g. below 7%, some intercritical austenite may transform to martensite, but the martensite content will be 50 vol. % or less. Therefore, by enhanced levels of Mn, a low reheating temperature $T_{RH}$ (e.g. less than 700° C.) and a high amount of retained austenite (20 vol. % or more) can be guaranteed. This high amount of retained austenite partially transforms to martensite during deformation in the shaping step, causing a transformation induced plasticity (TRIP) effect giving rise to a high strain hardening rate (=high elongation).

When the steel strip is intercritically annealed (batch or continuous) below a temperature of 700° C., the strip has a high strength and high ductility due to presence of a high amount of retained austenite. During subsequent flash reheating also in the intercritical temperature range below 700° C., the blanks are only softened to facilitate deformation. Because of the very short reheating and soaking time Mn, being a relatively large sized substitutional element, cannot diffuse to a substantial degree, and therefore the mechanical properties remain substantially unchanged. Preferably the same or lower temperature for the reheating step is used as for the intercritical annealing ensuring that Mn distribution from austenite to ferrite remains essentially the same, and the ferrite content also does not change due to reheating. The martensite, if present, may be slightly tempered, but it will contribute to even higher elongation values.

The residual elongation (or the in-service ductility) of the article is preferably 25% or more because of the design of the substrate alloy composition. An intercritical reheating step of a medium Mn steel approach is preferably used to obtain a mixed microstructure of ultrafine ferrite (0.5-2.0 micron) and areas of martensite and high retained austenite. Therefore, the high ductility developed in the as-supplied strips is maintained.

In a further aspect the invention relates to a shaped article, in particular obtained by means of the method according to the invention, from a steel composition consisting of (in wt. %):
C: 0.01-0.2;
Mn: 3.1-9.0;
Al: 0.5-3.0;
optionally one or more further alloying elements:
Si: less than 1.5;
Cr: less than 2.0;
V: less than 0.1;
Nb: less than 0.1;
Ti: less than 0.1;
Mo: less than 0.5;
nevitable impurities, and
the remainder being Fe.

Preferably the shaped article has the microstructure and mechanical properties as outlined above. The preferred compositional ranges for the various elements are also applicable.

A preferred shaped article is an automotive component, like a structural part of the chassis, in particular those requiring high energy absorption combined with high strength. Non-limiting examples include B-pillars and (front) longitudinal bars.

The invention will be elucidated with reference to the examples described below.

FIG. 1 shows cross-sections of hot formed components.

Steel samples were made on laboratory scale with the composition as shown in Table 1. Carbon, manganese, silicon and aluminium are elements added to the steel. The other elements are unavoidable impurities in the steel.

TABLE 1

Composition of the steel in wt. %

| Steel | C | Mn | Si | Al | P | S | Cr | Mo |
|---|---|---|---|---|---|---|---|---|
| S1 | 0.13 | 7.32 | 0.22 | 1.57 | 0.001 | 0.002 | 0.003 | 0.010 |
| S2 | 0.094 | 7.15 | 0.20 | 1.54 | 0.001 | 0.0014 | 0.004 | 0.002 |

| Steel | Nb | Ti | V | N | Fe |
|---|---|---|---|---|---|
| S1 | 0.001 | 0.001 | 0.002 | 0.0009 | Balance |
| S2 | 0.0007 | 0.001 | 0.001 | 0.0010 | Balance |

The steel samples were made using the following process steps. Ingots of 200 mm×100 mm×100 mm were made in vacuum induction furnace. They were reheated for 2 hours at 1250° C., and rough-rolled to 25 mm thickness. Then, the strips were reheated again for 30 minutes at 1250° C., and hot rolled to 3 mm thickness. Thereafter, the hot rolled steels were air cooled to room temperature.

After that the strips were annealed for 96 hours at 650° C. and air cooled to room temperature. Then the strips were pickled in HCl acid to remove the oxides, and cold rolled to 1.5 mm thickness. Thereafter the samples were continuously annealed at 675° C. for 5 minutes and hot-dip galvanised in a Zn-0.4Al wt. % bath at 460° C. using a Rhesca annealing/hot dip galvanising simulator.

Then the Zn-coated strips of dimensions 200 mm×100 mm were hot-formed in a hot forming press supplied by Schuler SMG GmbH & Co. KG using the thermal cycles given in Table 2. Two types of for forming tools were used—a flat tool for obtaining tensile, bending and microstructure specimens, and a hat-top tool to obtain omega-shaped profiles for micro-cracking investigation.

TABLE 2

Reheating time and temperatures

| Steel | Reheating Temperature, (° C.) | Reheating Time (second) |
|---|---|---|
| S1 | 675 | 180 |
| S2 | 617 | 46 |
|  | 675 | 57 |

The reheating time in Table 2 is the time needed to heat the strip from room temperature to the reheating temperature plus the soaking time. The time for heating the strip from room temperature up to the reheating temperature is approximately 8 seconds. After reaching the reheating temperature, the strip is transferred to the hot forming press in 3 seconds and then hot pressed and cooled down to a temperature below 200° C., removed from the press and further cooled down in air.

Tensile tests were performed in accordance with NEN10002 standard. Tensile specimens had a 50 mm gauge length and 20 mm width. Bending tests were in accordance with VDA 238-100 standard on 40 mm×30 mm×1.5 mm specimens.

Table 3 shows the results of the mechanical properties before hot forming, and Table 4 after hot forming. In the Tables 3 and 4, Rp=yield strength, Rm=ultimate tensile strength, Ag=uniform elongation, At=total elongation. BA=bending angle, L=longitudinal specimen where bending axis is parallel to the rolling direction, T=transversal specimen where bending axis is perpendicular to the rolling direction. The measured bending angles at 1.5 mm thickness were converted to 1 mm equivalents using the following formula: BA @ 1.0 mm thickness=measured BA×Square root of thickness.

TABLE 3

Mechanical properties of the Zn-coated blanks before hot press forming

| Steel | $R_p$, MPa | $R_m$ (MPa) | $A_g$ (%) | $A_t$ (%) | BA-L (°) | BA-T (°) |
|---|---|---|---|---|---|---|
| S1 | 919 | 989 | 25.9 | 31.4 | 125.0 | 153.9 |
| S2 | 970 | 997 | 9.5 | 15.1 | 103.6 | 137.7 |

TABLE 4

Mechanical properties of the Zn-coated steel sheets after hot press forming

| Steel | Reheating Temperature (° C.) | $R_p$ (MPa) | $R_m$ (MPa) | $A_g$ (%) | $A_t$ (%) | BA-L (°) | BA-T (°) |
|---|---|---|---|---|---|---|---|
| S1 | 675 | 895 | 1005 | 26.1 | 30.5 | 126.6 | 154.9 |
| S2 | 617 | 930 | 1037 | 15.2 | 15.4 | 93.6 | 136.2 |
|    | 675 | 906 | 1001 | 15.1 | 15.6 | 97.1 | 139.0 |

The microstructure of the samples was determined as follows. The amount of retained austenite has been determined by X-ray diffraction (XRD) at ¼ thickness location of the samples. The XRD patterns were recorded in the range of 45 to 165° (2Θ) on a Panalytical Xpert PRO standard powder diffractometer (CoK$_\alpha$-radiation). Quantitative determination of phase proportions was performed by Rietveld analysis using Bruker Topas software package for Rietveld refinement. Martensite content was determined from the peak-split at the ferrite diffraction locations in the diffractograms.

The microstructural components are shown in Table 5 for the blanks before hot forming, and in Table 6 for the components after hot forming.

TABLE 5

Microstructural components of the Zn-coated blanks before hot press forming

| Steel | Retained Austenite (vol. %) | Ferrite (vol. %) | Martensite (vol. %) |
|---|---|---|---|
| S1 | 40.0 | 45.3 | 14.7 |
| S2 | 33.8 | 50.2 | 16.0 |

TABLE 6

Microstructural components of the steels after hot press forming

| Steel | Reheating Temperature, ° C. | Retained Austenite (vol. %) | Ferrite (vol. %) | Martensite (vol. %) |
|---|---|---|---|---|
| S1 | 675 | 43.0 | 44.1 | 12.9 |
| S2 | 617 | 34.2 | 53.5 | 12.3 |
|    | 675 | 30.3 | 52.4 | 17.3 |

The components made from steel S2 at the reheating temperatures as given in Table 3 that were formed in a hat-top tool were examined by making a cross-section of the component. The side portion of the hat-top shape was examined under the microscope. Photographs of the cross-section are shown in FIG. 1 for both substrate composition S2. Both photographs show that the substrate is covered by a zinc coating having no cracks at all. Thus, these components will have a good corrosion resistance.

In comparison, the top photograph in FIG. 1 shows a cross-section of a hat-top made from zinc coated 22MnB5 substrate, which was hot formed using the standard hot forming cycle by heating a blank up to approximately 850° C., austenizing during approximately 5 minutes, and transferring to the press and hot pressing as described above. The 22MnB5 sample clearly shows many micro-cracks in the cross-section.

The invention claimed is:

1. A method of shaping an article from a zinc or zinc alloy coated steel blank, the steel consisting of in wt. %:
   C: 0.01-0.2;
   Mn: 3.1-9.0;
   Al: 0.5-3.0;
   optionally one or more further alloying elements:
   Si: less than 1.5;
   Cr: less than 2.0;
   V: less than 0.1;
   Nb: less than 0.1;
   Ti: less than 0.1;
   Mo: less than 0.5;
   inevitable impurities; and
   the remainder being Fe;
   the method comprising the steps of:
   a) annealing a strip of the steel and providing a blank of the zinc or zinc alloy coated steel obtained from the annealed strip;
   b) reheating of the blank obtained in step a) to a reheating temperature $T_{RH}$ in the range Ac3-200° C. to Ac3 of the steel;
   c) soaking the blank for a time up to 3 minutes at the reheating temperature $T_{RH}$;
   d) shaping the article in a press; and
   e) cooling the article,
   wherein reheating step b) comprises raising the temperature at a rate of 30° C./s or more to the reheating temperature $T_{RH}$;
   wherein between steps c) and d) the heated article is transferred to the press and a temperature drop does not exceed 150° C.,
   wherein the resulting shaped article has a microstructure comprising in vol. %
   ferrite: 30% or more;
   austenite: 20% or more;
   martensite: 50% or less including 0%.

2. The shaping method according to claim 1, wherein the reheating temperature $T_{RH}$ is in the range Ac3-100° C. to Ac3.

3. The shaping method according to claim 1, wherein in step c) the reheated blank is soaked for a time of less than 2 minutes.

4. The shaping method according to claim 1, wherein step e) comprises press quenching to a temperature in the range of 100-250° C. at a quenching rate of at least 3° C./s.

5. The shaping method according to claim 1, wherein step e) comprises air cooling to ambient temperature.

6. The shaping method according to claim 1, wherein in step a) the blank is obtained from an intercritically annealed, zinc or zinc alloy coated cold rolled or hot rolled steel strip.

7. The shaping method according to claim 6, wherein the reheating temperature $T_{RH}$ is lower than an intercritical annealing temperature.

8. The shaping method according to claim 1, wherein the steel in wt. % satisfies at least one elemental content selected from the group consisting of
   C content in the range of 0.05-0.20,
   Mn content in the range of 3.5-9.0, and
   Al content in the range of 0.6-2.9.

9. The shaping method according to claim 1, wherein the resulting shaped article as obtained has the following properties:
- yield strength: 800 MPa or more;
- tensile strength: 980 MPa or more;
- total elongation: 15% or more;
- minimum bending angle at 1.0 mm thickness: 90° or more.

10. The shaping method according to claim 1, wherein the reheating temperature $T_{RH}$ is in an intercritical temperature range Ac1 to Ac3.

11. The shaping method according to claim 1, wherein reheating step b) comprises raising the temperature at a rate of 100° C./s or more to the reheating temperature $T_{RH}$.

12. The shaping method according to claim 1, wherein in step c) the reheated blank is soaked for a time of less than 30 seconds.

13. The shaping method according to claim 1, wherein in step a) the blank is obtained from an intercritically annealed, zinc or zinc alloy coated cold rolled or hot rolled steel strip, which has been subjected to an intercritical annealing at a annealing temperature of less than 700° C.

14. The shaping method according to claim 1, wherein the steel in wt. % satisfies:
- C content in the range 0.1-0.19,
- Mn content in the range of 7.2-8.8, and
- Al content in the range of 1.0-2.25.

15. The shaping method according to claim 1, wherein the resulting shaped article has a microstructure comprising in vol. %
- ferrite: 40% or more;
- austenite: 30% or more;
- martensite: 30% or less including 0%.

16. The shaping method according to claim 1, wherein the resulting shaped article as obtained has the following properties:
- yield strength: 900 MPa or more;
- tensile strength: 1000 MPa or more;
- total elongation: 25% or more;
- minimum bending angle at 1.0 mm thickness: 100° or more.

17. The shaping method according to claim 1, wherein the steel consists of in wt. %:
- C: 0.094-0.13;
- Mn: 7.15-7.32;
- Al: 1.0-2.25;
- optionally one or more further alloying elements:
- Si: 0.15-1.0;
- Cr: 0.003-2.0;
- V: 0.001-0.1;
- Nb: 0.0007-0.1;
- Ti: 0.001-0.1;
- Mo: 0.001-0.5;
- inevitable impurities; and
- the remainder being Fe.

* * * * *